(12) United States Patent
Miller

(10) Patent No.: US 11,840,929 B2
(45) Date of Patent: Dec. 12, 2023

(54) RADIAL SEAL ARRANGEMENT

(71) Applicant: RTX Corporaton, Farmington, CT (US)

(72) Inventor: Jonathan Logan Miller, Belchertown, MA (US)

(73) Assignee: RTX CORPORATION, Farmington, CT (US)

( * ) Notice: Subject to any disclaimer, the term of this patent is extended or adjusted under 35 U.S.C. 154(b) by 84 days.

(21) Appl. No.: 15/930,644

(22) Filed: May 13, 2020

(65) Prior Publication Data

US 2021/0355836 A1  Nov. 18, 2021

(51) Int. Cl.
*F01D 11/00* (2006.01)
*F01D 25/16* (2006.01)

(52) U.S. Cl.
CPC ............ *F01D 11/003* (2013.01); *F01D 25/16* (2013.01); *F05D 2230/60* (2013.01); *F05D 2240/55* (2013.01)

(58) Field of Classification Search
CPC ......... F01D 11/003; F01D 25/16; F16J 15/44; F16J 15/441; F16J 15/445; F05D 2240/55; F05D 2230/60
See application file for complete search history.

(56) References Cited

U.S. PATENT DOCUMENTS

| | | | |
|---|---|---|---|
| 7,717,671 B2 | 5/2010 | Addis | |
| 9,915,175 B2 * | 3/2018 | Miller | .................. F01D 25/166 |
| 10,415,707 B2 | 9/2019 | Bidkar et al. | |
| 10,626,741 B2 * | 4/2020 | Miller | .................... F16J 15/441 |
| 2005/0087933 A1 | 4/2005 | Gittler | |
| 2009/0142180 A1 | 6/2009 | Munson | |
| 2010/0242437 A1 * | 9/2010 | Jarmon | .................. B64D 37/34 |
| | | | 60/266 |
| 2014/0265151 A1 | 9/2014 | Vasagar | |
| 2016/0208921 A1 * | 7/2016 | Miller | .................... F16J 15/441 |
| 2016/0348792 A1 | 12/2016 | Labbe | |
| 2017/0016350 A1 | 1/2017 | Miller et al. | |
| 2020/0056505 A1 | 2/2020 | Sakamoto et al. | |

FOREIGN PATENT DOCUMENTS

| | | | | |
|---|---|---|---|---|
| CN | 106795969 B | * | 3/2019 | ............. F16J 15/18 |
| EP | 2474711 B1 | | 7/2018 | |
| EP | 3263842 B1 | | 9/2019 | |
| GB | 2176253 A | * | 12/1986 | ............. F16C 17/18 |
| WO | WO-2015004357 A1 | * | 1/2015 | ............. F01D 25/28 |

OTHER PUBLICATIONS

European Search Report for European Application No. 21172417.4, dated Oct. 19, 2021, 10 pages.

* cited by examiner

*Primary Examiner* — Gilbert Y Lee
(74) *Attorney, Agent, or Firm* — CANTOR COLBURN LLP

(57) ABSTRACT

A seal assembly includes a rotating seal runner having an outer radial surface, and one or more rotationally stationary seal rings located radially outboard of the seal runner. Each seal ring has an inner radial surface, with the inner radial surface and the outer radial surface defining a sealing interface therebetween. An axially extending shape of the inner radial surface is selected utilizing a predicted shape of the outer radial surface at a selected operating condition of the seal assembly.

4 Claims, 4 Drawing Sheets

RADIAL SEAL ARRANGEMENT

BACKGROUND

Exemplary embodiments of the present disclosure pertain to the art of gas turbine engines, and in particular to radial seal arrangements of gas turbine engines.

Advanced, high-performance gas turbine engines will require improved performance main shaft bearing compartment seals while also being required to meet more aggressive cost, weight, size, environmental and reliability metrics. Carbon seals enable the engine and bearing compartment to function with minimal impact on Thrust Specific Fuel Consumption (TSFC), the Thermal Management System (TMS) and the Lubrication System. Such gas turbine engines require seals with improved wear resistance, improved performance, and improved reliability in order to meet customer/program metrics.

Typical radial seals often experience elevated segmented carbon element radial wear and seal runner distress and/or deterioration, which results in increased air leakage characteristics and compromises bearing compartment oil containment. Advanced gas turbine engine contain main shaft seals which are higher in rubbing velocity than our prior engine experience, which demand alternate solutions. The nature of the problem is that traditional methods for setting the pre-profile or pre-taper on the radial inner diameter sealing surface of the sealing rings causes the operational contact pressure to be elevated due to incorrect assumptions and non-optimized profile shape. This prior art method thus results in reduced contact area during operational thermal-structural deflections of the seal runner when the sealing rings are in contact. This increased contact pressure results in increased seal ring wear and engine/system impacts which could impact customer satisfaction and metrics (e.g. reduced service life, premature maintenance).

BRIEF DESCRIPTION

In one embodiment, a seal assembly includes a rotating seal runner having an outer radial surface, and one or more rotationally stationary seal rings located radially outboard of the seal runner. Each seal ring has an inner radial surface, with the inner radial surface and the outer radial surface defining a sealing interface therebetween. An axially extending shape of the inner radial surface is selected utilizing a predicted shape of the outer radial surface at a selected operating condition of the seal assembly.

Additionally or alternatively, in this or other embodiments the one or more seal rings includes a first seal ring, and a second seal axially aftward of the first seal ring.

Additionally or alternatively, in this or other embodiments the first seal ring has a first inner radial surface shape and the second seal ring has a second inner radial surface shape different from the first inner radial surface shape.

Additionally or alternatively, in this or other embodiments the selected operating condition is at an elevated operating temperature relative to ambient conditions.

Additionally or alternatively, in this or other embodiments a shape of the outer radial surface at ambient conditions differs from the predicted shape of the outer radial surface at the selected operating condition.

Additionally or alternatively, in this or other embodiments the axially extending shape of the inner radial surface is one or more of convex, concave or linear.

Additionally or alternatively, in this or other embodiments the one or more seal rings are retained in a seal housing.

In another embodiment, a gas turbine engine includes a combustor, a turbine driven by products of the combustor, a compressor operably connected to the turbine and driven by rotation of the turbine, and a seal assembly to seal between a rotating component and a rotationally stationary component of the gas turbine engine. The seal assembly includes a rotating seal runner located at the rotating component having an outer radial surface, and one or more rotationally stationary seal rings located radially outboard of the seal runner at the rotationally stationary component. Each seal ring has an inner radial surface. The inner radial surface and the outer radial surface define a sealing interface therebetween. An axially extending shape of the inner radial surface is selected utilizing a predicted shape of the outer radial surface at a selected operating condition of the seal assembly.

Additionally or alternatively, in this or other embodiments the one or more seal rings includes a first seal ring, and a second seal axially aftward of the first seal ring.

Additionally or alternatively, in this or other embodiments the first seal ring has a first inner radial surface shape and the second seal ring has a second inner radial surface shape different from the first inner radial surface shape.

Additionally or alternatively, in this or other embodiments the selected operating condition is at an elevated operating temperature relative to ambient conditions.

Additionally or alternatively, in this or other embodiments a shape of the outer radial surface at ambient conditions differs from the predicted shape of the outer radial surface at the selected operating condition.

Additionally or alternatively, in this or other embodiments the axially extending shape of the inner radial surface is one or more of convex, concave or linear.

Additionally or alternatively, in this or other embodiments the one or more seal rings are retained in a seal housing.

Additionally or alternatively, in this or other embodiments the rotating component is a shaft of the gas turbine engine.

Additionally or alternatively, in this or other embodiments a bearing system is supportive of the shaft, and the seal assembly is configured to seal the bearing system.

In another embodiment, a method of assembling a seal assembly includes predicting an outer radial surface shape of a seal runner at one or more operating conditions of the seal assembly, selecting complimentary seal ring inner radial surface shapes of one or more seal rings based on the predicted outer radial surface shape, manufacturing the one or more seal rings to provide the selected seal ring inner radial surface shapes, and installing the one or more seal rings radially outboard of the seal runner such that a seal interface is defined between the outer radial surface and the inner radial surface.

Additionally or alternatively, in this or other embodiments the outer radial surface shape is predicted via thermos-structural analysis.

Additionally or alternatively, in this or other embodiments the one or more seal rings includes a first seal ring, and a second seal axially aftward of the first seal ring.

Additionally or alternatively, in this or other embodiments the first seal ring has a first inner radial surface shape and the second seal ring has a second inner radial surface shape different from the first inner radial surface shape.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
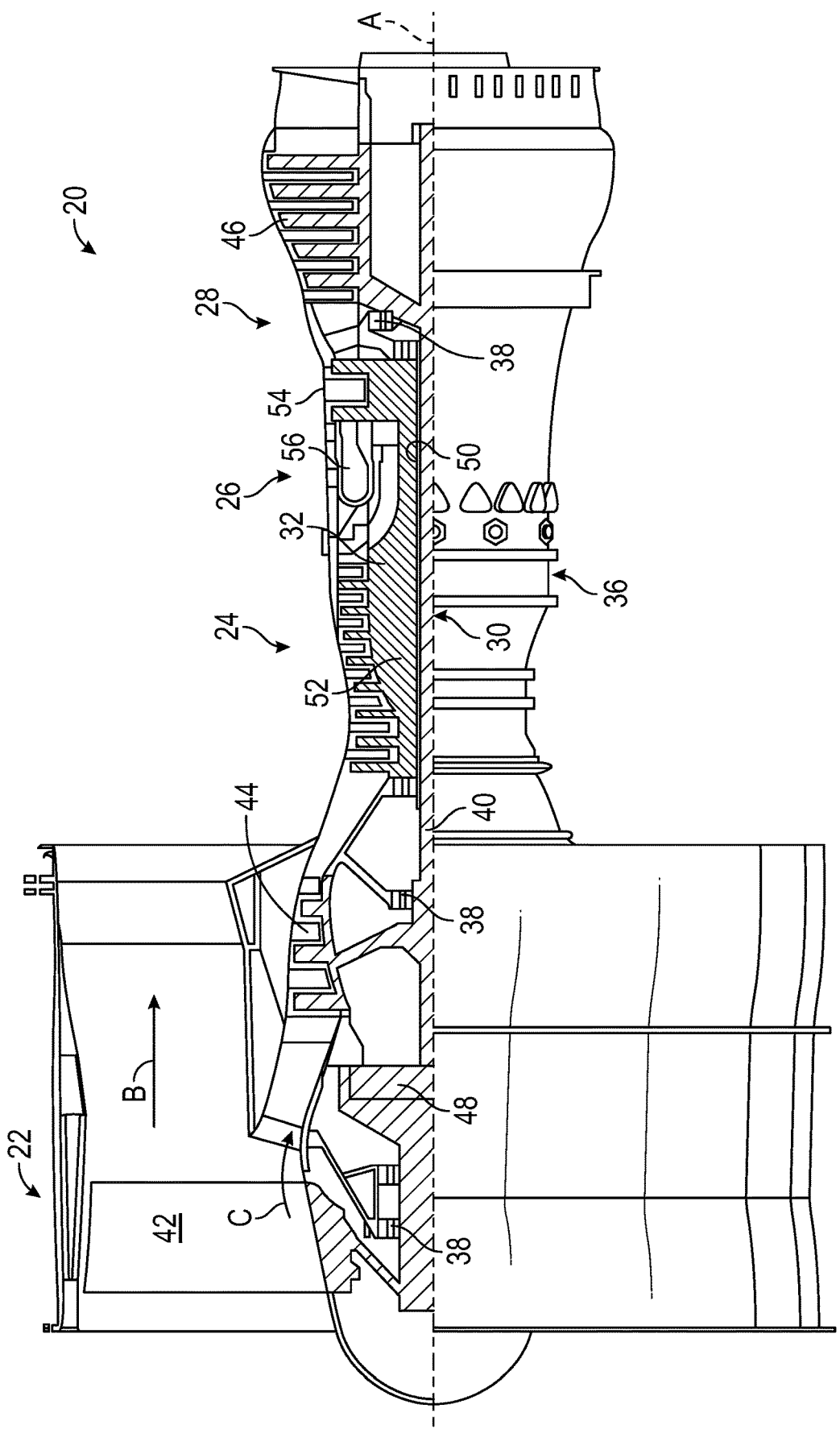
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° R)/(518.7° R)]^{0.5}$. The "Low corrected fan tip speed" as disclosed herein according to one non-limiting embodiment is less than about 1150 ft/second (350.5 m/sec).

Figure 2:
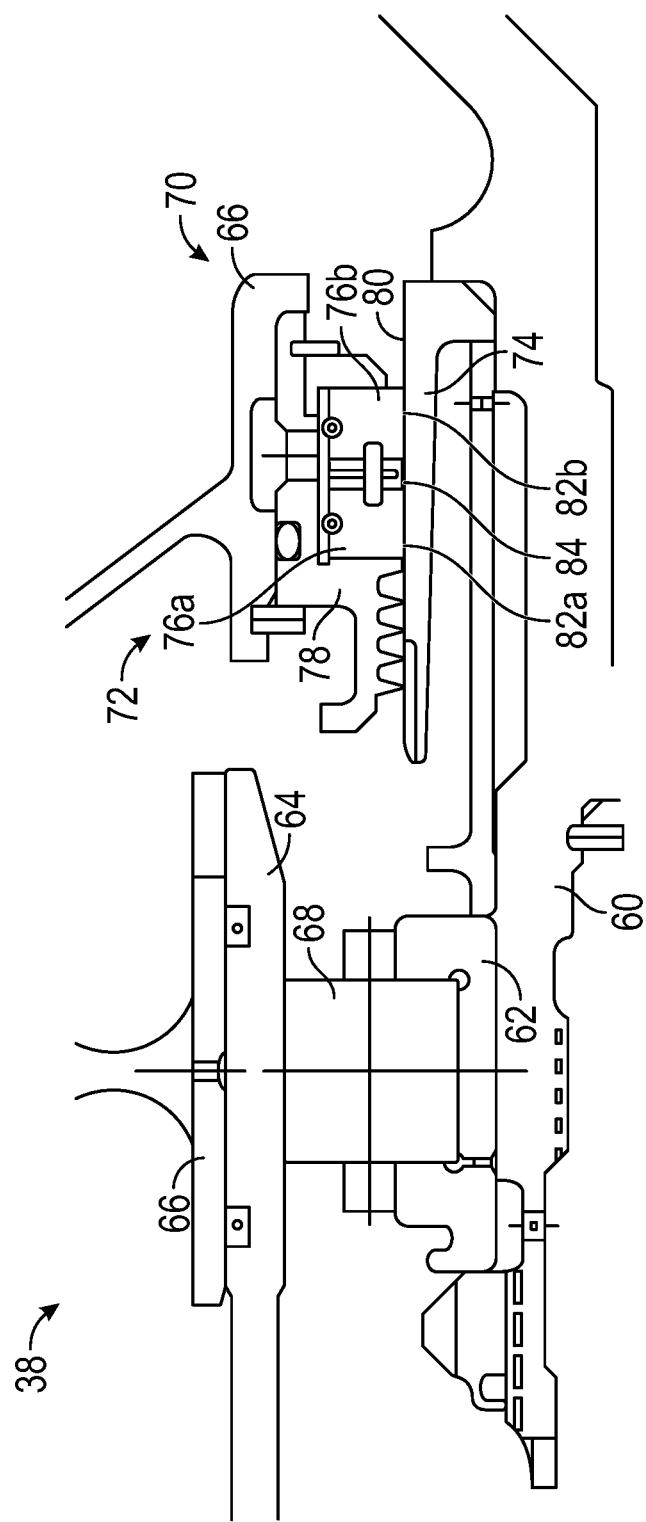
FIG. 2 is a partial cross-sectional view of an embodiment of a bearing system.

Referring to FIG. 2, illustrated is an embodiment of a bearing system 38. The bearing system 38 supports a rotating shaft 60, which may be inner shaft 40 or outer shaft 50. While bearing system 38 as shown and described herein as supportive of shaft 60, one skilled in the art will readily appreciate that the bearing system 38 may be supportive of other rotating components of the gas turbine engine 20. The bearing system 38 includes a bearing inner race 62 located at the shaft 60 and rotatable with the shaft 60. A stationary bearing outer race 64 is located at and secured to a fixed structure 66 of the gas turbine engine 20. A bearing element 68 is located radially between the bearing inner race 62 and the bearing outer race 64.

The bearing system 38 also includes one or more seal assemblies 70 to define a bearing compartment 72, providing for sealing and lubrication of the bearing system 38. The seal assembly 70 includes a seal runner 74 secured to and rotating with the shaft 60, and one or more seal rings 76 located radially outboard of the seal runner 74. In some embodiments, two seal rings 76, first seal ring 76a and second seal ring 76b are utilized. First seal ring 76a may be located axially forward of second seal ring 76b. The seal rings 76 are located in and retained in a seal housing 78 located radially outboard of the deal rings 76, and secured to the fixed structure 66. While the seal runner 74 rotates with the shaft 60, the seal rings 76 are rotationally stationary.

The seal runner 74 includes a seal runner outer radial surface 80 and each seal ring 76a, 76b similarly includes a seal ring inner radial surface 82a, 82b. The seal runner outer radial surface 80 and the seal ring inner radial surface 82a, 82b are in radial contact and define a seal interface 84 therebetween. It desired to have uniform contact between the seal runner outer radial surface 80 and the seal ring inner radial surface 82a, 82b to reduce seal wear and contact pressure, and thereby maintaining performance of the seal assembly 70. Due to differences in thermo-structural properties and performance between the seal runner 74 and the seal rings 76, fit of the seal rings 76 to the seal runner 74 at a build does not necessarily actually predict their relative fit at the significantly higher temperatures of operation of the gas turbine engine 20.

Figure 3:
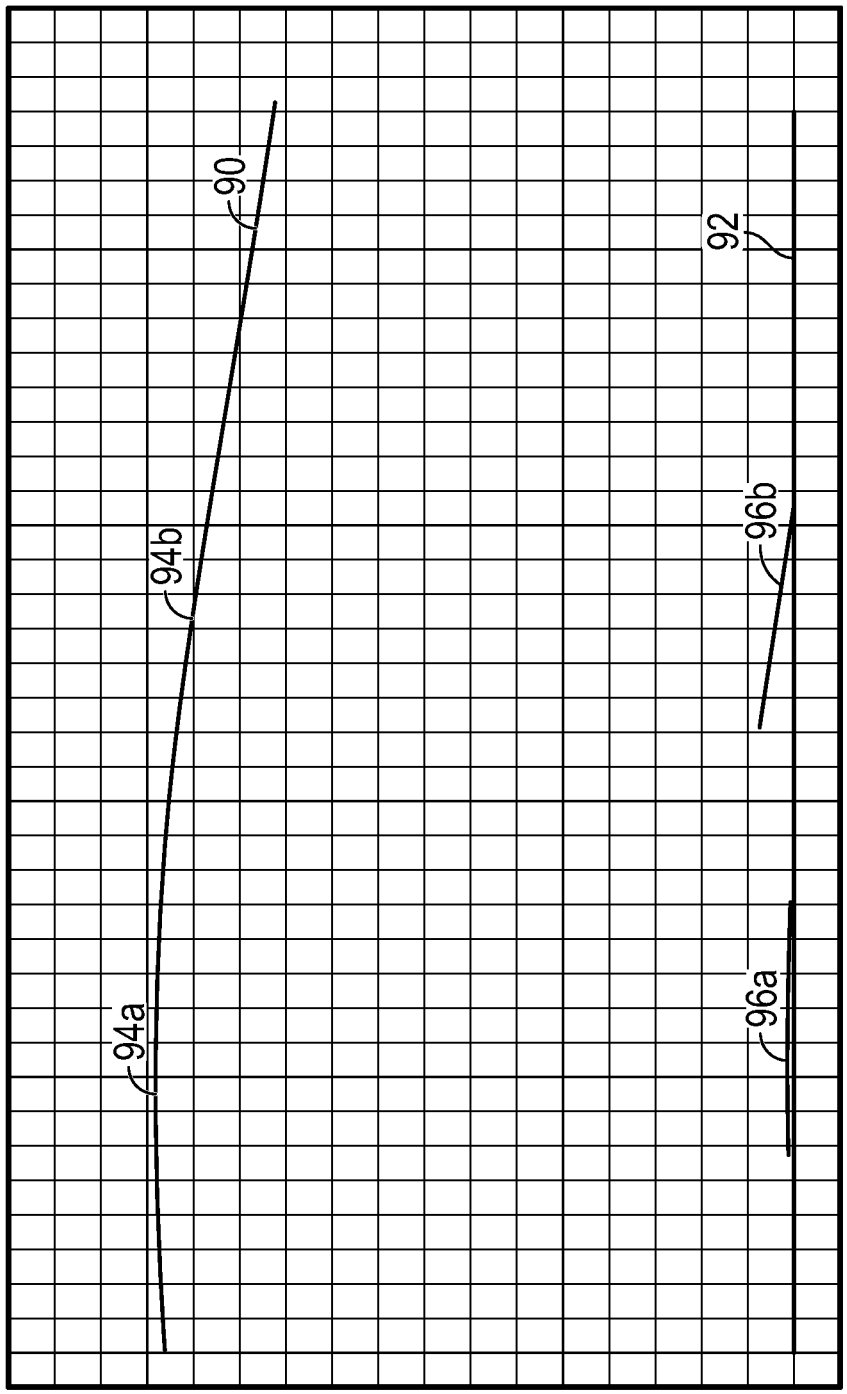
FIG. 3 is an illustration of seal ring profile shape versus seal runner profile shape.

To address this issue, and referring now to FIG. 3, the thermo-structural analysis is performed at a selected operational condition of the gas turbine engine 20 to determine a predicted high power operational seal runner outer radial surface shape 90, which differs from a colder, lower power seal runner contact surface shape 92. The seal rings 76a, 76b are configured at the initial manufacturing, cold condition have respective cold seal ring inner radial surface shapes 94a, 94b in the axial and radial coordinate direction. In some embodiments, the cold seal ring inner radial surface shapes 94a, 94b substantially match the high power operational seal runner outer radial surface shape 90, such that the cold seal ring inner radial surface shapes 94a, 94b substantially match high power operational seal ring inner radial surface shapes 96a, 96b, respectively. In other embodiments, the cold seal ring inner radial surface shapes 94a, 94b do not substantially match the high power operational seal ring inner radial surface shapes 96a, 96b.

In some embodiments, one operational condition may be utilized, while in other embodiments a multiple number of operational conditions, or a combination of operational conditions may be utilized to configure the seal ring inner radial surface shapes 96a, 96b. The high power operational seal runner outer radial surface shape 90 may differ from a low power seal runner outer radial surface shape 92. Further, seal ring inner radial surface shape 94a may differ from the seal ring inner radial surface shape 94b. In some embodiments the high power operating condition is at a higher temperature than typical ambient temperature. In some embodiments, the initial manufacturing, or cold operating condition is in a temperature range of –65 degrees Fahrenheit to 200 degrees Fahrenheit, while the high power operating condition is in a temperature range of 200 degrees Fahrenheit and above, in some embodiments up to 1000 degrees Fahrenheit.

Substantially conforming the high power operational seal ring inner radial surface shapes 94a, 94b to the high power operational seal runner outer radial surface shape 90 increases contact area of the seal ring 76 to the seal runner 74 during operation of the gas turbine engine 20 reduces operational contact pressure at the seal interface 84 thereby reducing seal wear. The seal ring inner radial surface shapes 94a, 94b may be manufactured as a concave shape, convex shape, linear shape, or other shape depending on the thermo-structural predictions.

Figure 4:
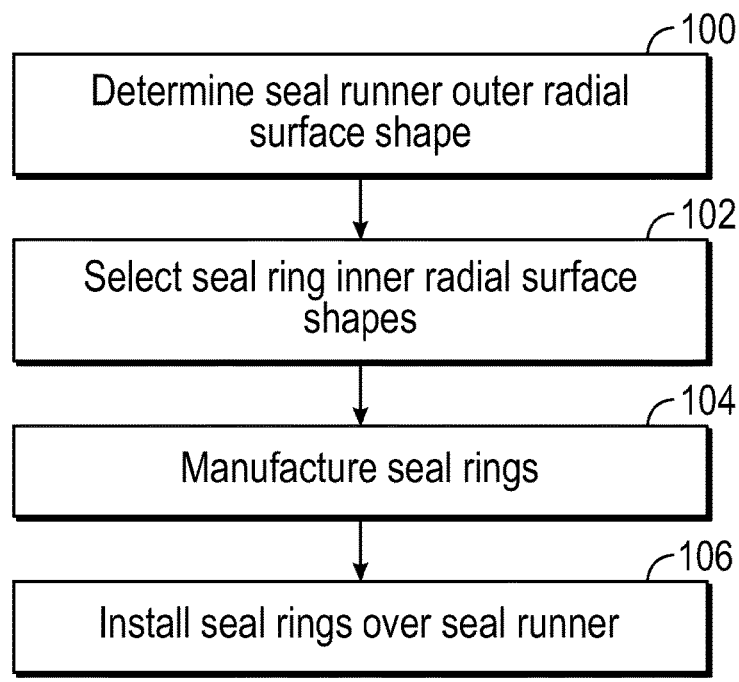
FIG. 4 is a schematic illustration of a method of assembling a seal assembly.

Referring now to FIG. 4, illustrated is a method of assembling a seal assembly 70. In block 100, thermo-structural analysis determines the high power operational seal runner outer radial surface shape 90 at one or more high power operating conditions of the gas turbine engine 20. In block 102, the seal ring inner radial surface shapes 96a, 96b are then selected based on the thermo-structural analysis results of runner outer radial surface shape 90 to increase contact area and reduce contact pressure during operation of the gas turbine engine 20. At block 104, the seal rings 76a, 76b are manufactured to provide the selected seal ring inner radial surface shapes 96a, 96b. At block 106, the seal rings 76a, 76b are installed over the seal runner 74.

Figure 5:
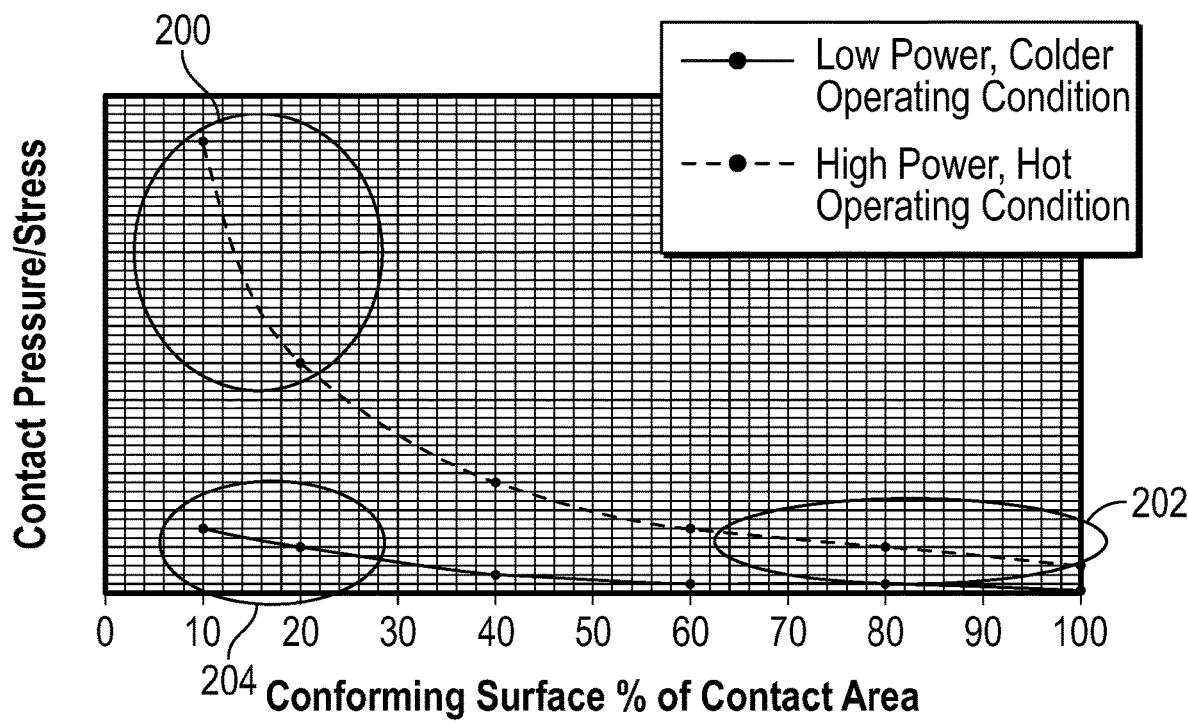
FIG. 5 illustrates a contact pressure versus percent contact area for a seal assembly.

Referring now to FIG. 5, illustrated is a plot of contact pressure at a seal assembly 70 relative to a percent contact area between the seal ring 76 and the seal runner 74. A first portion 200 of the graph illustrates a contact pressure of a typical prior art seal assembly. A second portion 202 illustrates a contact pressure of the seal assembly 70 at the high power operating condition, having a greater percent contact area than the prior art seal assembly. A third portion 204 illustrates a contact pressure of the seal assembly 70 at the cold operating condition, illustrating that while the percent contact area is reduced at the cold operating condition, the contact pressure does not greatly increase, thus the effect on seal assembly 70 wear is small.

Utilizing the seal assemblies 70 disclosed herein enables improvements in seal assembly reliability, improved customer satisfaction, and reduced aircraft/engine overhaul cycle requirements. The present seal assemblies 70 differs from prior technology by incorporating actual thermal-structural predictions into the manufactured pre-profile of the seal ring 76. This key difference enables improved system solutions/metrics and extended seal wear life.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of assembling a seal assembly, comprising:
  predicting an outer radial surface shape of a seal runner at one or more operating conditions of the seal assembly;

selecting complimentary axially-extending seal ring inner radial surface shapes of one or more seal rings based on the predicted outer radial surface shape;

manufacturing the one or more seal rings to a first shape to provide the selected seal ring inner radial surface shapes at the one or more operating conditions; and installing the one or more seal rings radially outboard of the seal runner such that a seal interface is defined between the outer radial surface and the inner radial surface;

wherein the selected operating condition is at an elevated temperature relative to ambient conditions;

wherein the elevated temperature is greater than 200 degrees F.;

wherein the axially extending shape of the inner radial surface is convex.

2. The method of claim 1, wherein the outer radial surface shape is predicted via thermos-structural analysis.

3. The method of claim 1, wherein the one or more seal rings comprises:

a first seal ring; and a second seal axially aftward of the first seal ring.

4. The method of claim 3, wherein the first seal ring has a first inner radial surface shape and the second seal ring has a second inner radial surface shape different from the first inner radial surface shape.

\* \* \* \* \*